(12) United States Patent
Buscheck

(10) Patent No.: US 9,765,604 B2
(45) Date of Patent: Sep. 19, 2017

(54) SYSTEMS AND METHODS FOR MULTI-FLUID GEOTHERMAL ENERGY SYSTEMS

(71) Applicant: Lawrence Livermore National Security, LLC, Livermore, CA (US)

(72) Inventor: Thomas A. Buscheck, Pleasanton, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 594 days.

(21) Appl. No.: 14/167,375

(22) Filed: Jan. 29, 2014

(65) Prior Publication Data

US 2014/0238672 A1 Aug. 28, 2014

Related U.S. Application Data

(60) Provisional application No. 61/767,998, filed on Feb. 22, 2013.

(51) Int. Cl.
*E21B 43/16* (2006.01)
*F24J 3/08* (2006.01)
*F03G 7/04* (2006.01)

(52) U.S. Cl.
CPC ............ *E21B 43/16* (2013.01); *E21B 43/168* (2013.01); *F24J 3/085* (2013.01); *F03G 7/04* (2013.01); *Y02E 10/10* (2013.01)

(58) Field of Classification Search
CPC ................................. F24J 3/085; Y02E 10/14
USPC ........................ 60/641.2, 641.3; 166/272.1
See application file for complete search history.

(56) References Cited

U.S. PATENT DOCUMENTS

| 4,059,959 | A | * | 11/1977 | Matthews | ................. F03G 7/04 165/45 |
| 5,032,284 | A | * | 7/1991 | Gallup | ..................... C02F 1/50 210/697 |
| 8,316,955 | B2 | | 11/2012 | Saar et al. | |
| 2006/0231455 | A1 | * | 10/2006 | Olsvik | .................... C01B 3/382 208/62 |
| 2010/0071366 | A1 | * | 3/2010 | Klemencic | ............... F03G 7/04 60/641.2 |
| 2010/0276146 | A1 | * | 11/2010 | Smith | .................... E21B 43/16 166/302 |
| 2011/0088896 | A1 | * | 4/2011 | Preston | .................... C01B 3/34 166/266 |

(Continued)

OTHER PUBLICATIONS

Buscheck et al. (Analysis of Operational Strategies for Utilizing CO2 for Geothermal Energy Production—Thirty-Eighth Workshop on Geothermal Reservoir Engineering, Stanford University—SGP-TR-198) Feb. 11, 2013.*

*Primary Examiner* — George Gray
(74) *Attorney, Agent, or Firm* — Harness, Dickey & Pierce, PLC

(57) ABSTRACT

A method for extracting geothermal energy from a geothermal reservoir formation. A production well is used to extract brine from the reservoir formation. At least one of nitrogen ($N_2$) and carbon dioxide ($CO_2$) may be used to form a supplemental working fluid which may be injected into a supplemental working fluid injection well. The supplemental working fluid may be used to augment a pressure of the reservoir formation, to thus drive a flow of the brine out from the reservoir formation.

19 Claims, 3 Drawing Sheets

(56) References Cited

U.S. PATENT DOCUMENTS

2012/0001429 A1* 1/2012 Saar .................. F01K 25/103
290/52
2013/0043678 A1* 2/2013 Saar .................. F02C 1/005
290/2
2013/0056171 A1* 3/2013 Klemencic ............ F03G 7/04
165/45

* cited by examiner

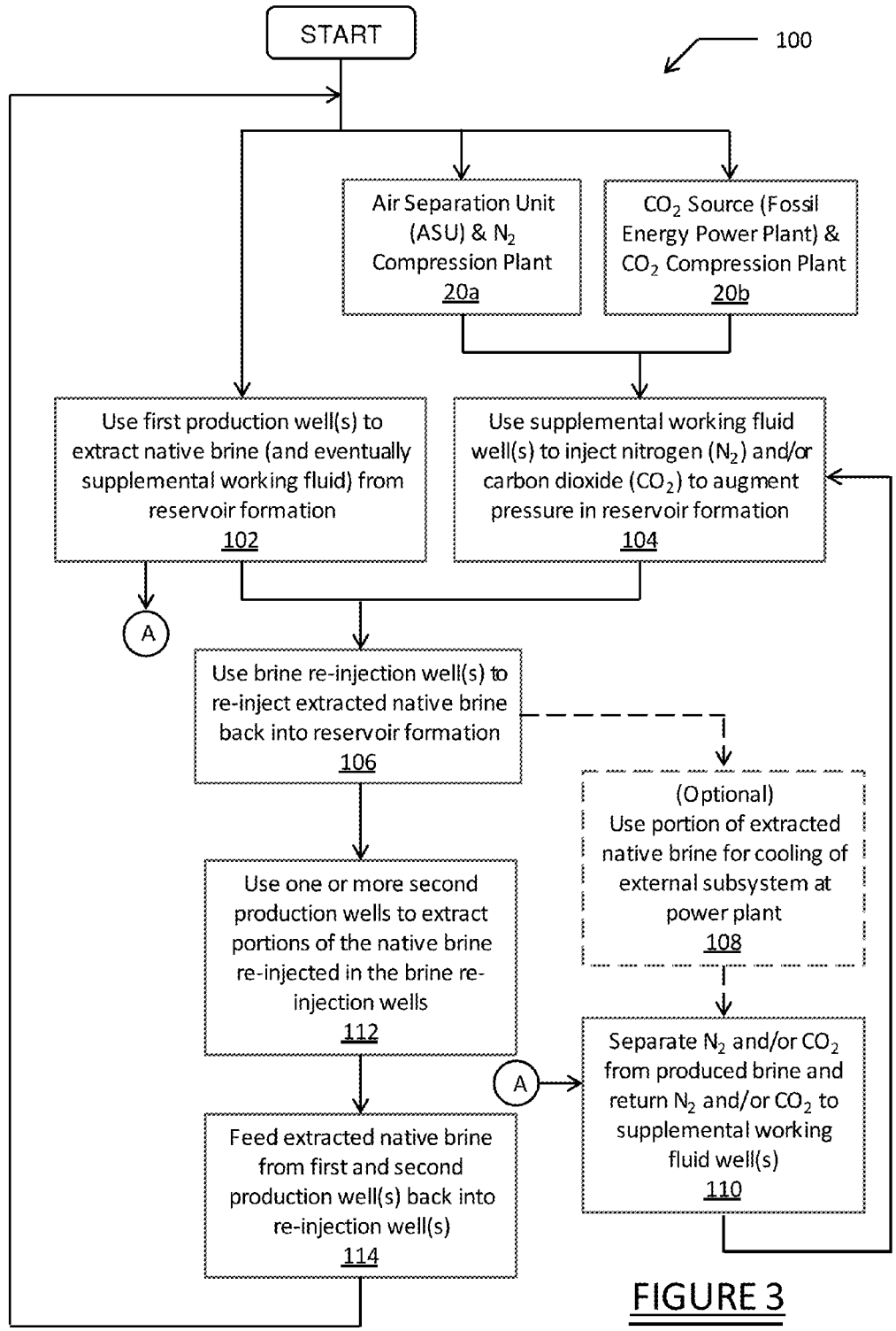

SYSTEMS AND METHODS FOR MULTI-FLUID GEOTHERMAL ENERGY SYSTEMS

CROSS-REFERENCE TO RELATED APPLICATIONS

This application claims the benefit of U.S. Provisional Application No. 61/767,998, filed on Feb. 22, 2013. The entire disclosure of the above application is incorporated herein by reference.

STATEMENT OF GOVERNMENT RIGHTS

The United States Government has rights in this invention pursuant to Contract No. DE-AC52-07NA27344, between the U.S. Department of Energy and Lawrence Livermore National Security, LLC, for the operation of Lawrence Livermore National Laboratory.

TECHNICAL FIELD

The present disclosure relates to systems and methods for multi-fluid geothermal energy generation, and more particularly to systems and methods for enhancing the production of geothermal energy from geothermal reservoir formations where insufficient working fluid and pressure depletion would otherwise limit the energy production from such reservoir formations.

BACKGROUND

The statements in this section merely provide background information related to the present disclosure and may not constitute prior art.

The economic viability of geothermal energy production depends on finding a subsurface geothermal resource with high enough temperature, which will yield high enough flow rates per well to justify exploration and well development costs. Insufficient working fluid and pressure depletion can limit well flow rates and increase the cost of powering the working-fluid recirculation system. Depending on geothermal resource temperature and geothermal reservoir permeability, the parasitic cost of driving the working-fluid recirculation system can be high, sometimes consuming more than half of the gross geothermal power output. A key goal in optimizing geothermal energy production is thus to minimize the parasitic cost of powering the working-fluid recirculation system. Because well costs constitute a major portion of capital costs, another key goal is to increase flow rates on a per well basis.

Besides geothermal resource temperature, two key factors affecting the parasitic cost for driving working-fluid recirculation in liquid-dominated, hydrothermal geothermal power systems are the permeability of the geothermal reservoir formation and whether artesian pressure exists in that reservoir to help drive flow up production wells. Without sufficient artesian pressure, extracting heat requires that formation brine be lifted up production wells, such as with submersible pumps, which can consume a significant portion of the electricity generated by the power plant. Sedimentary formations are attractive candidates for geothermal power production because they have the advantages of higher reservoir permeability and much larger areal extent, compared to hydrothermal systems in crystalline rock formations where conventional geothermal power systems are usually deployed. See, for example, Buscheck, T. A., Chen, M., Lu, C., Sun, Y., Hao, Y., Celia, M. A., Elliot, T. R., Choi, H., and Bielicki, J. M., "Analysis of Operational Strategies for Utilizing $CO_2$ for Geothermal Energy Production," *Proceedings of the 38th Workshop on Geothermal Reservoir Engineering*, Stanford University, Palo Alto, Calif., 11-13 Feb. 2013. High permeability and large areal extent are conducive to higher per well flow rates for both injection and production wells. Recently, carbon dioxide ($CO_2$) has been considered as a working fluid because its advantageous properties reduce the parasitic cost of working-fluid recirculation. Moreover, the low viscosity of $CO_2$, compared to formation brine, and the thermosiphon effect promote higher per well flow rates for both injection and production wells. See, for example, Brown, D. W., 2000, "A Hot Dry Rock Geothermal Energy Concept Using Supercritical $CO_2$ Instead of Water", *Proceedings of the 25th Workshop on Geothermal Reservoir Engineering*, Stanford University, 233-238; Pruess, K., 2006, "Enhanced Geothermal Systems (EGS) Using $CO_2$ As Working Fluid—a Novel Approach for Generating Renewable Energy With Simultaneous Sequestration of Carbon", *Geothermics*, 35, 351-367; Saar, M. O., Randolph, J. B., and Kuehn, T. H., 2010, "Carbon Dioxide-based Geothermal Energy Generation Systems and Methods Related Thereto"; US Patent Application 20120001429; Randolph, J. B., and Saar, M. O., 2011, "Combining Geothermal Energy Capture With Geologic Carbon Dioxide Sequestration", *Geophysical Research Letters*, 38. It is worth noting that nitrogen ($N_2$) also has advantageous properties that reduce the parasitic cost of powering the working-fluid recirculation system. See, for example, Buscheck, T. A., Chen, M., Hao, Y., Bielicki, J. M., Randolph, J. B., Sun, Y., and Choi, H., "Multi-Fluid Geothermal Energy Production and Storage in Stratigraphic Reservoirs", *Proceedings of the Geothermal Resources Council 37th Annual Meeting*, 2013.

With the growing penetration of renewable energy sources in electrical grids, there is currently a strong need for systems and methods which can help to increase the reliability and dispatchability of these energy sources.

SUMMARY

In one aspect the present disclosure relates to a geothermal energy production method for extracting geothermal energy from a reservoir formation. The method may comprise using a production well to extract brine from the reservoir formation. At least one of nitrogen ($N_2$) and carbon dioxide ($CO_2$) may then be injected as a supplemental working fluid into a supplemental working fluid injection well. The supplemental working fluid may be used to augment a pressure in the reservoir formation, to thus drive a flow of the brine out from the reservoir formation and up the production well.

In another aspect the present disclosure relates to a geothermal energy production method for extracting geothermal energy from a reservoir formation containing brine. The method may comprise using at least one first production well to extract the brine from the reservoir formation. The method may also comprise using a second supplemental working fluid injection well to inject a supplemental working fluid formed by at least one of nitrogen ($N_2$) and carbon dioxide ($CO_2$) into the reservoir formation, and using the supplemental working fluid to augment a pressure in the reservoir formation, to thus drive a flow of the brine and, eventually, a flow of supplemental working fluid, out from the reservoir formation and up the production well. A third re-injection well may be used to re-inject brine extracted from the reservoir formation back into the reservoir formation. A fourth brine production well may be used to extract portions of the brine that have been re-injected via the third re-injection well.

In still another aspect the present disclosure relates to a geothermal energy production system for extracting geothermal energy from a reservoir formation of brine. The system may comprise at least one production well to extract the brine from the reservoir formation. At least one supplemental working fluid injection well may be included for injecting a supplemental working fluid in the form of nitrogen ($N_2$) and/or carbon dioxide ($CO_2$) into the reservoir formation and using the injected supplemental working fluid to augment a pressure in the reservoir formation, to thus enhance a drive of flow of the brine and, eventually, a flow of supplemental working fluid, up the at least one production well and out from the reservoir formation.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 3 is a high level flowchart illustrating a plurality of operations that may be implemented using the system shown in FIG. 1 to obtain geothermal energy recovery.

DETAILED DESCRIPTION

Figure 1:
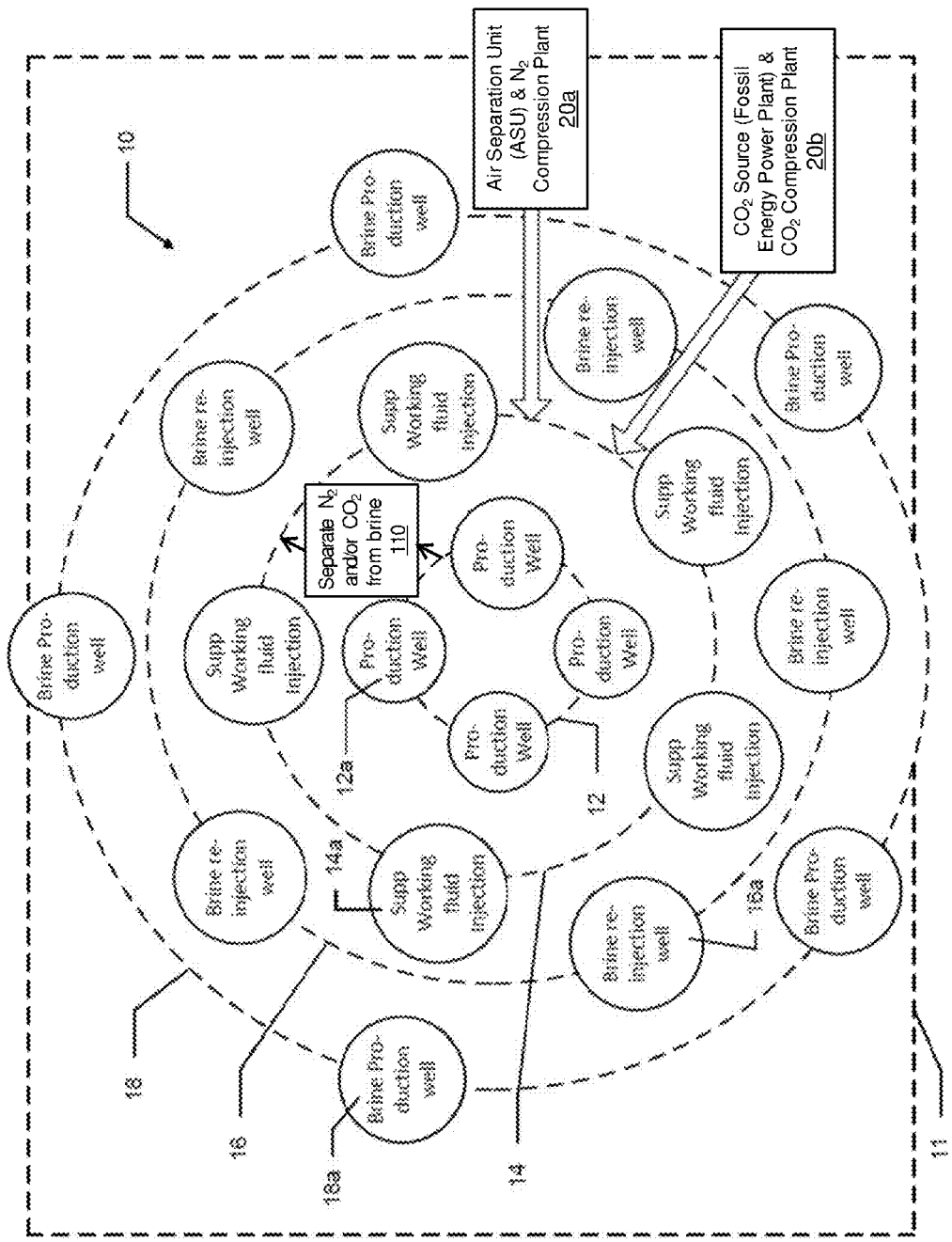
FIG. 1 is a high level plan view of one embodiment of a system in accordance with the present disclosure in which a plurality of rings of wells are used for forming a geothermal energy recovery system.

The following description is merely exemplary in nature and is not intended to limit the present disclosure, application, or uses. It should be understood that throughout the drawings, corresponding reference numerals indicate like or corresponding parts and features.

To address the above-described operational challenges, the present disclosure describes a plurality of approaches in which significant quantities of one or more supplemental working/pressure-support fluids may be injected into a geothermal reservoir formation to support high production flow rates. In at least one embodiment the present disclosure describes a system and method for generating pressure sufficiently high to drive high production flow rates of native brine and, eventually, the supplemental working fluid itself.

An important goal of the systems and methods of the present disclosure is to minimize the parasitic cost of powering the working-fluid recirculation system. As noted above, two key factors affecting this parasitic cost are the formation permeability of the geothermal resource and whether sufficient formation pressure exists in that resource to drive artesian flow in the production wells.

Referring to FIG. 1, in one embodiment the present disclosure involves a geothermal production system 10 that may be viewed as a "hybrid" working fluid system. The system 10 is located within a geothermal reservoir formation 11. The system 10 may make use of both native brine and a supplemental working fluid to extract geothermal energy. The supplemental working fluids may include supercritical $CO_2$ and supercritical $N_2$. However, it is especially effectively deployed when $N_2$ is included as one of the constituents. Particular advantages of using $N_2$ are that it can be separated from air at low cost, compared to that of captured $CO_2$. Nitrogen is also non-corrosive and will not react with the reservoir formation 11. The addition of $N_2$ can improve the economics of $CO_2$-enabled geothermal energy production and mitigate operational issues associated with $CO_2$. If a two-stage, nitrogen-enriched combustion process is used to generate electricity; the resulting flue gas can have low enough concentrations of oxidants to be a suitable, low-cost source of $N_2$ and $CO_2$ for injection in supplemental working fluid wells. The systems and methods of the present disclosure can also utilize conventional flue gas as the supplemental working fluid to extract geothermal energy and methane from deep, unmineable coal seams.

In FIG. 1 the system 10 may be deployed with (as few as) four rings of production and injection wells. This well arrangement significantly enhances overall efficiency of the system 10. An inner ring 12 consists of a plurality of production wells 12a for extracting native brine from the reservoir formation 11, and eventually a flow of supplemental working fluid. A second ring 14 consists of a plurality of supplemental working fluid injection wells 14a for injecting a supplemental working fluid into the reservoir formation 11. More specifically, the second ring 14 of supplemental working fluid injection wells 14a may be used for injecting $N_2$ and/or $CO_2$ into the reservoir formation 11. Hence, as shown in FIG. 1, the present disclosure may involve a dedicated air separation unit (ASU) and $N_2$ compression plant 20a. Also as shown in FIG. 1, the present disclosure may involve a dedicated source of supercritical $CO_2$, such as from a fossil energy power plant, and a $CO_2$ compression plant 20b. A third ring 16 may consist of a plurality of brine re-injection wells 16a for re-injecting extracted native brine back into the reservoir formation 11. A fourth ring 18 of brine production wells 18a may be used to recover portions of the native brine re-injected via the third ring of re-injection wells 16a and to relieve overpressure in areas adjacent to the reservoir formation 11. The inner ring 12 of production wells 12a and the outer ring 18 of brine production wells 18a may be completed at various depths to provide better control of working fluid and energy recovery for improved sweep efficiency, which reduces thermal drawdown and increases power generation and its sustainability. The rings of injection wells 14a and 16a may also be completed at multiple depths, as will be described in greater detail herein, to provide better control of working fluid and energy recovery. It will be appreciated that a greater or lesser plurality of wells may be included in each of the rings 12-18 than what is shown in FIG. 1. Furthermore, while the wells 12a-18a are shown in FIG. 1 as being arranged generally concentrically, this is not absolutely critical to efficient operation of the system 10. However, the fourth ring of wells 18a are preferably arranged to at least partially circumscribe the third (re-injection) wells 16a, which are in turn preferably arranged to at least partially circumscribe the second (injection) wells 14a, which are in turn preferably arranged to at least partially circumscribe the production wells 12a.

Figure 2:
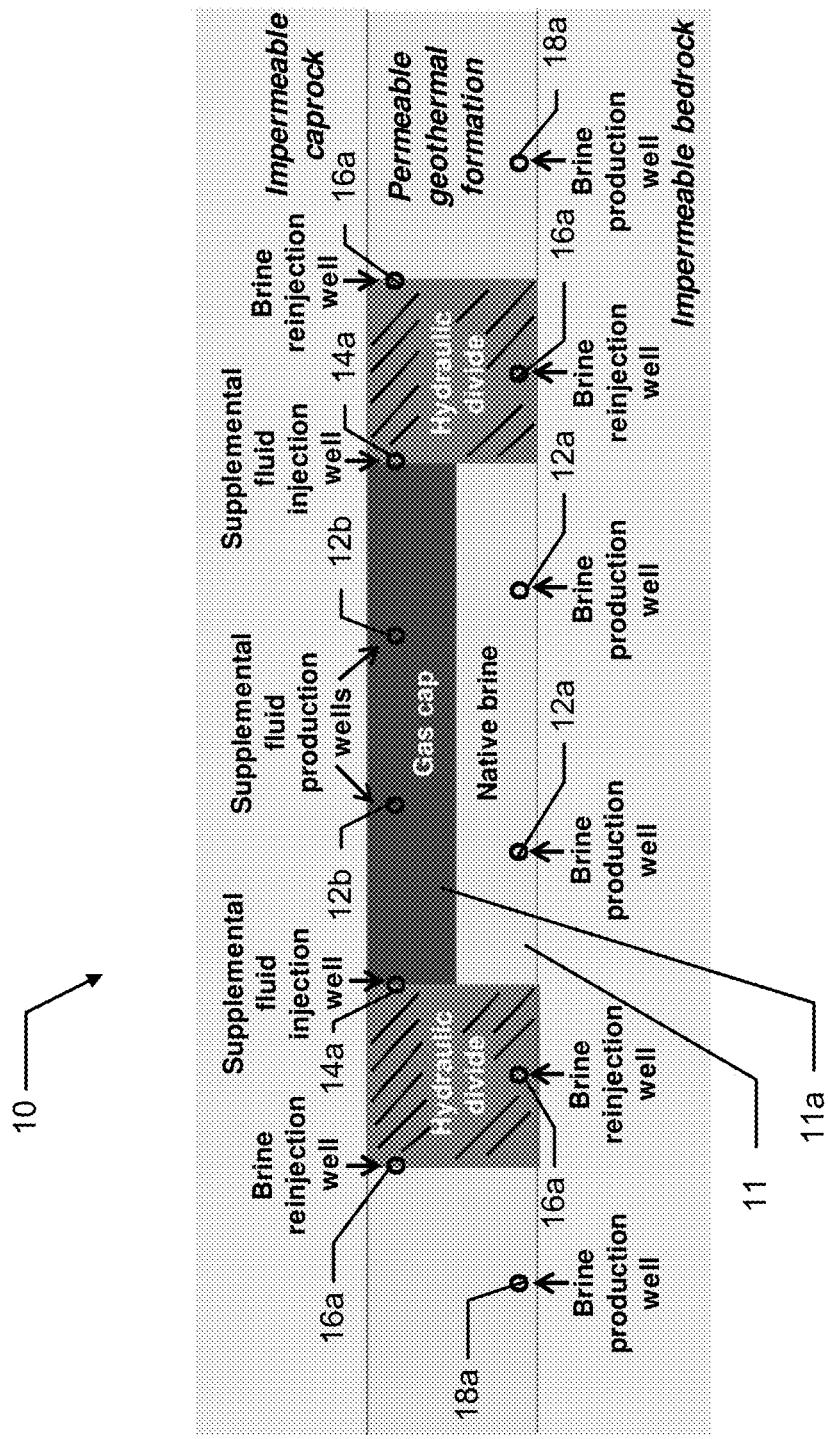
FIG. 2 is a high level side view of one example of how the wells shown in FIG. 1 may be configured at different depths, and also how horizontal wells within a given ring may also be configured at different depths to tailor the system to the specific reservoir formation at which the system is being employed.

Referring to FIGS. 1 and 2, the multi-ring approach of the system 10 can take advantage of the fact that horizontal well drilling technology allows for precise directional control of the well orientation; hence it is realistic to create precisely curved injection and production intervals. Another important reason for using a plurality of rings 12-18 is to conserve the pressure energy from the injection process and to minimize the loss of the supplemental working fluid. The four ring configuration (or variations of that configuration) creates a hydraulic divide, which is a distinct region of overpressure as shown in FIG. 2. It should be noted that the impermeable caprock and bedrock as shown in FIG. 2 provide vertical confinement of supplemental working fluid and pressure. It should also be noted that the geologic structure of the geothermal reservoir system may also provide some partial lateral confinement of supplemental working fluid and pressure. It is important that the four rings of wells be arranged to complement the lateral confinement already partially provided by the geologic structure. Thus, the combination of the geologic structure and the well arrangement can provide complete circumferential confinement of supplemental working fluid and pressure. The four rings 12-18 facilitate a range of pressure management strategies to spread out reservoir overpressure and thereby limit its magnitude, to thus significantly reduce the possibility of induced seismicity and leakage of the supplemental working fluid. The hydraulic divide (FIG. 2) that is created by the four ring configuration of the system 10 shown in FIG. 1 also allows the production wells 12a and 18a to be segregated into two groups, with the inner ring 12 of wells 12a transitioning from brine to supplemental working fluid production, and the outer ring of wells 18a only producing brine. Segregation of the production wells 12a and 18a in this fashion can help simplify well-field operations.

With specific reference to FIG. 2, a high level side view illustrates that the wells within one or more of the rings 12-18 may be located at different depths in the reservoir formation 11. More specifically, the brine re-injection wells 16a may be located at different depths relative to the hydraulic divide, which is created within the reservoir formation 11. The benefits of the hydraulic divide are that it conserves pressure and supplemental working fluid and segregates the production wells into those that transition from brine to supplemental working fluid production and those that only produce brine. Another important benefit of this configuration is that the large volume of the reservoir formation inside the hydraulic divide can be used to store large quantities of energy. Accordingly, the hydraulic divide is analogous to how a dam functions in storing energy for hydroelectricity generation. Production wells 12a, 12b, and 18a can be controlled (i.e., turned on and off) like a spillway to schedule power delivery. A plurality of production wells 12a and 12b are also included for initially extracting native brine and eventually extracting the supplemental working fluid from a gas cap 11a overlying the native brine within the reservoir formation 11. While they may produce brine at early time, Wells 12b are primarily used for extracting supplementing working fluid supercritical nitrogen ($N_2$) and/or supercritical carbon dioxide ($CO_2$) from the gas cap 11a. The gas cap gradually expands vertically downward with time, driving native brine to production wells 12a, using a process called gravity-drainage double-displacement. Depending on how far the gas cap expands vertically downward, production wells 12a may also eventually transition from being brine production wells to supplemental fluid production wells.

With reference to FIG. 3, a high level flowchart 100 is presented that shows various operations that may be performed as the system 10 is in operation. It will be appreciated that the specific sequence of operations may be varied somewhat from that shown in FIG. 3. In addition, one or more operations may be included between various ones of the operations shown in FIG. 3. At operations 102 and 104 native brine is extracted from the reservoir formation 11 and supplemental working fluid (e.g., $N_2$) is injected into the reservoir formation 11 to augment pressure in the formation so as to create artesian pressure conditions. At operation 106 the re-injection wells 16a are used to re-inject the extracted native brine back into the reservoir formation 11. Operation 108 is optional. Operation 108 may be employed to use a portion of the extracted native brine for cooling of a subsystem of a power plant. Operation 110 is used to separate $N_2$ and/or $CO_2$ and to return (recycle) the $N_2$ and/or $CO_2$ to the supplemental working fluid injection wells 14a. Operation 112 involves using one or more of the second (i.e., brine) production wells 18a to extract portions of the native brine re-injected from the re-injection wells 16a. Operation 114 may involve feeding extracted native brine from the production wells 12a and 18a back into the re-injection wells 16a.

Because the system 10 has the option of using a readily available supplemental working fluid (i.e., $N_2$), it is not constrained to continuous, steady supplemental working fluid injection operations. As a result, the geothermal operators have the option of injecting a significant fraction of the supplemental working fluid (i.e., $N_2$) during times of minimum power demand or during times of peak power availability from intermittent renewable sources of power, such as wind and solar. Hence, the system 10 can be integrated into power grids to provide an efficient means for bulk energy storage. While the system 10 is well suited for sedimentary formations, it may also be suitable for fractured crystalline rock.

After supercritical $CO_2$ and/or $N_2$ is injected it will then tend to migrate to the gas cap at the top of the reservoir (not shown), which would grow with time, and provide ongoing pressure support for brine and supplemental working fluid (i.e., $CO_2$ and $N_2$) production. If $N_2$ were to flow back to the brine production well 12a, it would mix with and be co-produced with the brine, reducing the density of the fluid mixture in the well. The reduction in fluid density would reduce the pressure gradient in the well, which could also result in flashing of the hot geothermal brine. Either one of these effects would result in artificial lift, thereby increasing the flow rate of brine. Therefore, variants of the present disclosure can be useful in augmenting the flow rate of brine production wells by virtue of $N_2$-enhanced artificial lift.

The above-described multi-fluid energy recovery approach may also be deployed in a staged manner. For example, Stage 1 may involve recirculation of pure $N_2$ between the injection wells 14a and production wells 12b (and possibly 12a) in FIG. 1. Thus, Stage 1 is $N_2$-based heat extraction. Thus, during Stage 2, geothermal energy recovery may be achieved by any one of $CO_2$-based, $CO_2/N_2$-based or brine-based heat extraction. Because $N_2$ has a lower heat capacity than $CO_2$ and brine, the formation between the injectors and producers would still be relatively hot, and it would be possible to continue to sweep heat out of the formation with either brine or $CO_2$, which are more effective heat carriers than $N_2$. During the transition the extracted $N_2$ would not be re-injected into the same injector/producer module; rather, it could be injected into an adjoining injector/producer module that was undergoing Stage 1 operations. If $CO_2$ is used in Stage 2, a benefit of this approach is that the $N_2$ will have dried out the formation between the injection and production wells, making it more likely that dry $CO_2$ would be produced at wells 12b rather than wet $CO_2$. This may be important to limiting operational issues associated with wet $CO_2$, such as possible corrosion in wellbores and surface equipment. If $CO_2$ is used in Stage 2, an additional benefit of this two-stage approach is that during the transition period supercritical $CO_2$ will be co-produced with supercritical $N_2$, with the resulting fluid mixture having a lower density than that of pure supercritical $CO_2$, which will reduce the pressure gradient in the supplemental working fluid production well. This effect will provide artificial lift, which can enhance the production rate of $CO_2$ in addition to allowing the operators the option of increasing the wellhead pressure. It will also be appreciated that geothermal resources are often located in regions where water is scarce. In such cases, unless extracted geothermal brine is used for cooling purposes, the geothermal plant must utilize air cooling (rather than water cooling). This will reduce plant efficiency. In conventional brine-based geothermal operations, it is often necessary to re-inject all of the brine in order to maintain enough reservoir pressure. But with the system 10, large quantities of a supplemental working fluid (e.g., $N_2$) are being injected for pressure support, and for heat extraction. This supplemental working fluid injection allows for the possibility of some of the extracted geothermal brine being utilized for cooling purposes without incurring a significant reduction in reservoir pressure. Thus, the injection of a pressure-support fluid, such as $N_2$, provides the opportunity of increasing overall energy conversion efficiency of the geothermal well-field and power plant.

While the teachings of the present disclosure are highly advantageous for applications involving sedimentary reservoirs, they can also be advantageous for deep reservoirs in crystalline rock. In the latter case, the geothermal resource may lack both formation permeability and brine. In such cases it may be advantageous to deploy a two-stage approach, similar to what is described above, except that Stage 2 would involve $CO_2$ injection. In deep crystalline-rock settings, matrix porosity and permeability will be small, with virtually all formation porosity and permeability being in the fractures. Fluid recirculation will primarily occur in a volume of rock where fractures may have been hydraulically stimulated by injection operations, with little possibility for the leak-off of the working fluid. In such instances the net storage of $CO_2$ would be quite low, with a high percentage of produced $CO_2$ being recirculated. In such cases geothermal energy production per net mass of stored $CO_2$ would be high, enhancing economic viability. An important benefit of this approach is that $N_2$ injection during Stage 1 would displace native brine (as well as brine from any hydraulic fracture operations) from the connected fractures between the injectors and producers. Therefore, the $CO_2$ that is injected during Stage 2 would be less likely to contact water. This is significant because dry $CO_2$ is much less corrosive than wet $CO_2$. Consequently, the geothermal system would involve two working fluids (e.g., $N_2$ and dry $CO_2$), which would be much less likely to pose operational challenges associated with recirculating brine, such as those caused by reactions with the formation rocks and by scale in wellbores and surface equipment. It would also pose fewer operational challenges than what would be associated with recirculating wet $CO_2$, such as corrosion in wellbores and surface equipment.

Still another advantage of the two-stage $N_2/CO_2$ approach described above is that it does not require "make up" water (or brine), which would be particularly valuable at geothermal sites where water resources are scarce. Deployment of the two-stage $N_2/CO_2$ approach in impermeable crystalline rock would not require the use of concentric rings of producers and injectors, as illustrated in FIG. 1 and as discussed earlier for sedimentary reservoirs, because fluid and pressure would be conserved by the finite volumetric extent of the zone of stimulated fracture permeability.

Prior work with $N_2$ injection has been applied in oil reservoirs using the gravity-drainage, double-displacement process. Typically this involves injecting gas up-dip in the oil reservoir and producing oil down-dip in that reservoir. This method works in oil reservoirs where a distinct gas cap exists at the top of a dipping reservoir. Whether or not the teachings described herein concerning supplementing working-fluid injection are applied in a dipping or non-dipping geothermal reservoir, they can be deployed with a well configuration that takes advantage of the gravity-drainage, double-displacement process. For oil reservoirs, the injected gas may be $CO_2$, flue gas, methane, or $N_2$. The largest oil reservoir using the $N_2$-injection-driven, gravity-drainage, double-displacement process is the Cantarell Complex in the Gulf of Mexico. This oil field, which is operated by Pemex (Petroleos Mexicanos), generates $N_2$ using the largest air separation unit (ASU) in the world. $N_2$ injection operations at the Cantarell Complex, which began in 2000, have proceeded very smoothly with little down time, and have successfully increased oil production rates for more than a decade.

The supplemental working fluid approach described herein is unique in several respects, and one especially because it is targeted to displace brine for geothermal heat extraction, and also because the injected $N_2$ can function as a working fluid for heat extraction. Thus, the system 10 and its variants described herein may be highly effective when the geothermal formation has a distinct dip, by injecting the supplemental working fluids ($CO_2$ and/or $N_2$) up-dip, and producing geothermal brine down-dip. When the geothermal formation does not have a distinct dip, the system 10, with its four concentric rings 12-18 of wells, may be highly effective in using the supplemental-working-fluid-injection-driven, gravity-drainage, double-displacement process to displace brine to the production wells 12. When the geothermal reservoir either consists of a very thick permeable layer or consists of stacks of permeable layers sandwiched between relatively impermeable layers, the approach implemented using the system 10 can be deployed with multiple levels of injection and production wells (FIG. 2). The upper injector/producer rings may recirculate the supplemental working fluids and the lower injector/producer rings may recirculate brine.

The system 10 and its variants described herein are also unique because it can be used to enable bulk energy storage to address supply/demand imbalances for electrical grids. The system 10 and its variants enables the parasitic power load for fluid recirculation (dominated by supplemental working fluid injection) to be shifted in time, which provides bulk energy storage. The process of turning the production wells on and off (analogous to how a spillway is used in pumped hydroelectric storage) also provides bulk energy storage.

Still another advantage of the present system 10 and its variants is that the net storage of injected supplemental working fluid displaces an equivalent volume of supplemental make-up brine for reinjection into the geothermal formation and/or for water-cooling purposes in the geothermal power plant. A distinct advantage is that the supplemental make-up brine is derived from the same formation in which it will be re-injected. Consequently, that make-up brine will be chemically compatible with the formation. Had the make-up brine been imported from a different formation, there would be a significant possibility that the brine would not be chemically compatible with the formation, which could lead to operational challenges. Hence, with the system 10 and its variants, $N_2$ injection can serve multiple valuable functions: (1) pressure support to drive artesian flow, (2) working fluid for heat extraction, (3) bulk energy storage, (4) providing chemically compatible make-up brine for re-injection, (5) providing brine for cooling purposes in the geothermal power plant, (6) providing artificial lift that will enhance brine production in brine production wells, and (7) providing artificial lift to $CO_2$ production in supplemental working fluid production wells that are producing some $CO_2$.

Still another advantage of the present system 10 and its variants is that it reduces or eliminates the need for submersible pumps. Submersible pumps are costly and pose operational challenges. The parasitic power load associated with submersible pumps can be quite large, particularly for low temperature geothermal resources. The operating lifetime of submersible pumps decreases significantly with increasing temperature. Therefore, the operating and maintenance costs associated with submersible pumps can be quite high for medium to high temperature geothermal resources. Moreover, there are geothermal resources with temperatures that are simply too high for any conventional submersible pump to survive. The system 10 also has the potential of generating production well flow rates that are significantly greater than those that would be achievable using submersible pumps. Thus, the system 10 and methodology described herein, along with their variants, can take full advantage of the large productivity inherent to long-reach horizontal wells, which is economically valuable, particularly for very deep geothermal resources. The system 10 and its variants, because of the significantly enhanced flow rates, may also be able to take advantage of geothermal resources where temperature of the extracted brine would not be sufficient to make the energy recovery operation cost efficient, if submersible pumps (with their lower flow rates) were required.

The systems and methods for geothermal energy production described herein represent a significant advance in the art by adding the option of using $N_2$. Providing the use of $N_2$ as one option for a supplemental working fluid is especially advantageous because $N_2$ can be separated from air at much lower cost than captured $CO_2$, it is not corrosive and will not geochemically react with the formation, and has no raw material supply risk, as is discussed by Buscheck, T. A., Chen, M., Hao, Y., Bielicki, J. M., Randolph, J. B., Sun, Y., and Choi, H., "Multi-Fluid Geothermal Energy Production and Storage in Stratigraphic Reservoirs", *Proceedings of the Geothermal Resources Council* $37^{th}$ *Annual Meeting*, 2013. Using $N_2$ also enables bulk energy storage, while mitigating any possible operational issues with $CO_2$. The systems and methods of the present disclosure arrange injection and production wells in such a way as to conserve the supplemental working fluids and pressure, thereby improving the efficiency of energy production and storage operations. Thus, the systems and methods of the present disclosure obtain maximum energy production and storage benefits from fluid-injection operations. The systems and methods disclosed herein are especially advantageous in part because they use multiple working fluids for heat extraction and power generation, including the following combinations: (1) brine and $CO_2$, (2) brine and $N_2$, or (3) brine, $CO_2$ and $N_2$, which provides operational flexibility and the ability to optimize heat sweep. This is a significant improvement over brine-based and $CO_2$-based geothermal power systems.

It should also be appreciated that geothermal heat is the only renewable energy source with a constant flux, unlike the major renewable energy technologies (wind and solar), which are variable and subject to uncertainty in the availability of the primary energy resource. Because the systems and methods disclosed herein can store energy in the form of pressurized fluids, they can selectively produce hot fluids and generate power when grid power demand is high, as well as reduce or stop that production when power demand is low. Thus, the systems and methods disclosed herein can deliver renewable energy to customers when it is needed, rather than when the supply of wind, solar, and hydro energy happens to be greatest, which can have a transformational impact in realizing the full potential of the major renewable energy sources.

Lastly, it will be appreciated that a significant advantage of the variants of the system 10 and the methods discussed herein is that a plurality of fluids are used for geothermal heat extraction. This "multi-fluid" approach (brine with $N_2$, brine with $CO_2$, or brine with mixtures of $N_2$ and $CO_2$) to geothermal heat extraction may provide a number of advantages, not the least of which is significantly enhancing operational flexibility and adaptability to better address the needs of specific geothermal reservoir formations.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A multi-fluid geothermal energy production method for extracting geothermal energy from a reservoir formation containing brine for use in geothermal energy production system operably associated with an electrical power grid, the method comprising:

using a production well to extract brine from the reservoir formation;

injecting at least one of liquid nitrogen ($N_2$) and carbon dioxide $CO_2$, as a supplemental working fluid, into a supplemental working fluid injection well and using the supplemental working fluid to augment a pressure in the reservoir formation, to thus drive a flow of the brine, and eventually the supplemental working fluid, up the production well and out from the reservoir formation, to enable the brine to be used to help generate electric power, the supplemental working fluid injection well being located a first distance from the production well; and using a plurality of brine re-injection wells arranged to at least partially circumscribe the supplemental working fluid injection well, each said brine re-injection well being located at one or more distances which are all greater than the first distance, to re-inject the brine recovered from the reservoir formation back into the reservoir formation, the brine being re-injected as needed to at least partially force the injected supplemental working fluid toward the production well, the re-injected brine flowing toward the supplemental working fluid injection well along a path without intervening production of the re-injected brine along the path.

2. The method of claim 1, further comprising injecting sufficient quantities of the liquid nitrogen into the production well to provide artificial lift and thereby enhance well productivity.

3. The method of claim 2, further comprising co-injecting the liquid nitrogen ($N_2$) and carbon dioxide ($CO_2$) as the supplemental working fluid into at least one of the supplemental working fluid injection well to augment a pressure in the reservoir formation.

4. The method of claim 1, wherein the injecting at least one of liquid nitrogen ($N_2$) and carbon dioxide ($CO_2$) comprises injecting carbon dioxide ($CO_2$) as a supplemental working fluid into the supplemental working fluid injection well, and further comprising using the production well and the supplemental working fluid injection well to recirculate the carbon dioxide.

5. The method of claim 1, further comprising at least one of:
wherein the injecting of the liquid nitrogen comprises injecting pure liquid nitrogen, followed by ceasing the injection of the pure liquid nitrogen and then injecting only carbon dioxide as the supplemental working fluid; or
wherein the injecting of the liquid nitrogen comprises injecting the pure liquid nitrogen and then ceasing the injection of the pure liquid nitrogen and injecting a mixture of the pure liquid nitrogen and carbon dioxide as the supplemental working fluid; or
wherein the injecting of the liquid nitrogen comprises injecting the pure liquid nitrogen and then ceasing the injection of the pure liquid nitrogen and injecting brine as the supplemental working fluid.

6. The method of claim 1, further comprising using a brine production well, located at a horizontal distance from the production well that is greater than that of the brine re-injection well, to withdraw portions of the brine that have been introduced to the reservoir formation via the brine re-injection wells.

7. The method of claim 1, further comprising using at least a portion of the brine extracted from the production well for cooling purposes in a power plant.

8. The method of claim 1, further comprising:
using an additional production well and an additional supplemental working fluid injection well, configured to operate at a different elevation level from the production well and the supplemental working fluid injection well, to recirculate the brine.

9. The method of claim 8, further comprising using the production well and the supplemental working fluid injection well to recirculate the supplemental working fluid.

10. A geothermal energy production method for extracting geothermal energy from a reservoir formation containing brine, the method comprising:
using a production well to extract the brine from the reservoir formation;
using a supplemental working fluid injection well to inject a supplemental working fluid formed by at least one of nitrogen ($N_2$) and carbon dioxide ($CO_2$) into the reservoir formation, and to use the supplemental working fluid to augment a pressure in the reservoir formation, to thus drive a flow of the brine, and eventually the supplemental working fluid, up the production well and out from the reservoir formation;
using a plurality of brine re-injection wells arranged to at least partially circumscribe the supplemental working fluid injection well, to re-inject brine extracted from the reservoir formation back into the reservoir formation, the brine re-injection wells being positioned such that each of the brine re-injection wells is located at a greater horizontal distance from the production well than the supplemental working fluid injection well is located, the brine being re-injected as needed to at least partially force the injected supplemental working fluid toward the production well, the re-injected brine flowing toward the supplemental working fluid injection well along a path without intervening production of the re-injected brine along the path; and
using an additional brine production well to extract portions of the brine that have been re-injected via the brine re-injection wells.

11. The method of claim 10, wherein using a supplemental working fluid injection well to inject a supplemental working fluid formed by at least one of nitrogen ($N_2$) and carbon dioxide ($CO_2$) into the reservoir formation, further comprises using a plurality of supplemental working fluid injection wells to inject at least one of nitrogen and carbon dioxide into the reservoir formation, and locating the plurality of supplemental working fluid injection wells to at least partially circumscribe the production well.

12. The method of claim 11, wherein the plurality of supplemental working fluid injection wells are at least partially circumscribed by the plurality of brine re-injection wells.

13. The method of claim 12, wherein using an additional brine production well to extract portions of the brine that have been re-injected via the brine re-injection well, further comprises using a plurality of brine production wells to extract portions of the brine, and locating the plurality of brine production wells to at least partially circumscribe the plurality of brine re-injection wells.

14. The method of claim 11, wherein one of the plurality of supplemental working fluid injection wells or one of the plurality of brine re-injection wells is used to create a hydraulic divide in the reservoir formation, the hydraulic divide operating to store a quantity of energy.

15. The method of claim 10, further comprising co-injecting both of the nitrogen ($N_2$) and the carbon dioxide ($CO_2$) into the supplemental working fluid injection well to augment the pressure in the reservoir formation.

16. The method of claim 10, further comprising using a portion of the extracted brine for cooling a subsystem at a power plant.

17. A multi-fluid geothermal energy production system operably associated with an electrical power grid for extracting geothermal energy from a reservoir formation of brine, the system comprising:
at least one production well to extract the brine from the reservoir formation;
at least one supplemental working fluid injection well for injecting a supplemental working fluid formed by at least one of nitrogen ($N_2$) and carbon dioxide ($CO_2$) into the reservoir formation and using the injected supplemental working fluid to augment a pressure in the reservoir formation, to thus enhance a drive of flow of the brine, and eventually the at least one of nitrogen and carbon dioxide, up the at least one production well and out from the reservoir formation; and
a plurality of brine re-injection wells arranged to at least partially circumscribe the at least one supplemental fluid injection well, to re-inject the brine recovered from the reservoir formation back into the reservoir formation, the brine re-injection wells being configured such that an amount of re-injected brine will at least partially force the injected supplemental working fluid toward the at least one production well, the re-injected brine flowing toward a most proximate of the at least one supplemental working fluid injection well along a path without intervening production of the re-injected brine along the path.

18. The system of claim 17, wherein the nitrogen comprises pure nitrogen, and wherein the system is further configured to operate as one of:
  to stop injecting the pure nitrogen and to thereafter inject carbon dioxide ($CO_2$) into the at least one supplemental working fluid injection well; or
  to stop injecting the pure nitrogen and to inject a mixture of the nitrogen and carbon dioxide into the at least one supplemental working fluid injection well; or
  to stop injecting the pure nitrogen and to inject brine.

19. The system of claim 17, further comprising:
  an additional production well located at a greater horizontal distance from the at least one production well than the re-injection well to extract portions of the brine injected back into the reservoir formation via the re-injection wells to thus relieve pressure in subterranean areas adjacent to the reservoir formation.

* * * * *